May 24, 1960 A. MASTRANDREA 2,937,542
TREAD ELEVATING ATTACHMENT FOR ACCELERATOR PEDAL
Filed Dec. 17, 1957
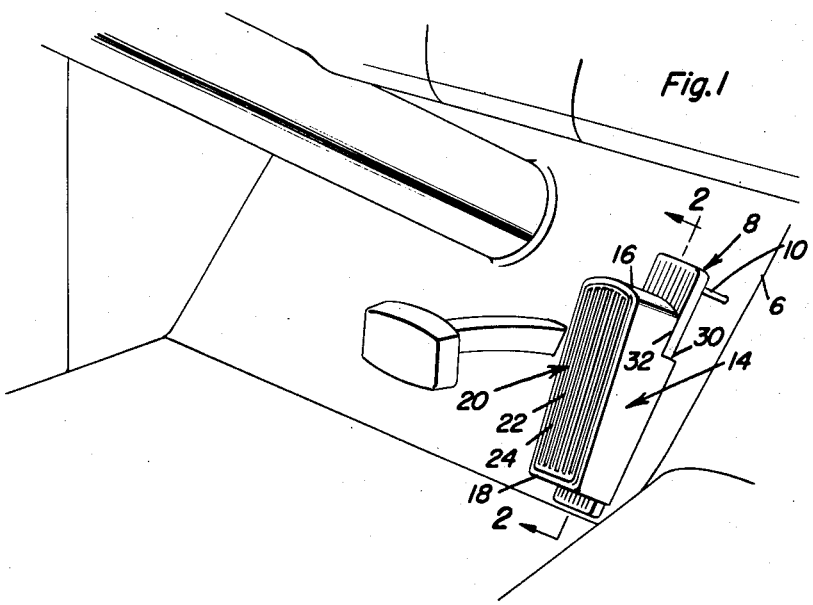
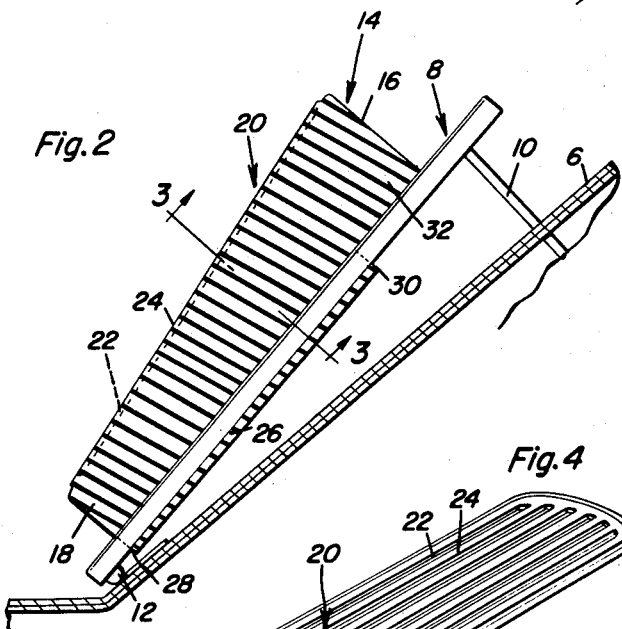
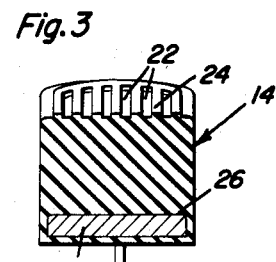
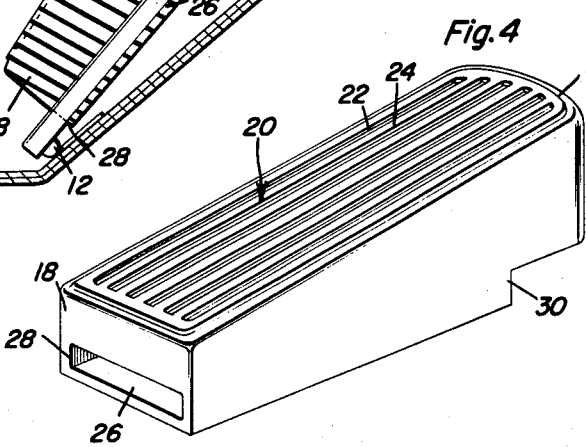
Anthony Mastrandrea
INVENTOR.

United States Patent Office 2,937,542
Patented May 24, 1960

2,937,542

TREAD ELEVATING ATTACHMENT FOR ACCELERATOR PEDAL

Anthony Mastrandrea, 38 Canal St., Westerly, R.I.

Filed Dec. 17, 1957, Ser. No. 703,314

1 Claim. (Cl. 74—563)

This invention relates to automobile accessories, generally speaking, and pertains in particular to a simple, practical and a reliable attachment which when applied to the upper or tread surface of an accelerator pedal serves to raise the surface to a predetermined and desired elevation and to, in this manner, better accommodate the operating foot of a short-legged driver.

The problem of adapting the tread of an accelerator pedal to accommodate drivers of different statures has long existed and, as a matter of fact, many efforts have been put forth by others working in the field looking toward a satisfactory solution of the problem. Extensions and lifts have been appropriated for use, and for the most part an elevating block seems best suited for the purposes. Despite the development of the art it appears that prior patented constructions have not, evidently, met with wide-spread adoption and use.

An obvious objective in the instant matter is to achieve the desired results more satisfactorily and to do so by way of a highly simple, practical and an economical pedal attachment. To this end the attachment is characterized by a molded wedge-shaped rubber or an equivalent block. This block is fashioned in such a way that the upper side provides an auxiliary as well as an elevated anti-skid tread. The lower surface provides mating anti-slipping contact with the regular tread on the stock pedal. Also, the bottom is provided with a bore providing a passage through and beyond which the accelerator pedal is passed and to, in this manner, joint the attachment to the pedal.

Other objects, features and advantages will become more readily apparent from the following description and the accompanying drawing.

In the drawing, wherein like numerals are employed to designate like parts throughout the views:

Fig. 1 is a perspective view of a fragmentary nature showing a portion of the floorboard and the pedal plus the attachment.

Fig. 2 is a view on an enlarged scale taken on the line 2—2 of Fig. 1, looking in the direction of the arrows.

Fig. 3 is a cross-section on the line 3—3 of Fig. 2.

Fig. 4 is a perspective view of the attachment by itself.

Referring now to the drawings and particularly to Fig. 1 the floorboard of the automobile is denoted by the numeral 6. The regular accelerator pedal is denoted at 8, the rod which is operated thereby being denoted at 10. The pedal inclines rearwardly and downwardly and the rearward end is hinged, as usual, on the floorboard as at 12.

The improved attachment, sometimes referred to as an adapter, comprises a rubber or an equivalent wedge-like block denoted as an entity by the numeral 14. The forward end 16 is thicker or of a greater cross-section than the rearward end 18 and the width of the block corresponds approximately to the width of the accelerator pedal as the drawings show. The top surface, which is the auxiliary tread, is denoted by the numeral 20 and it is made anti-slipping by way of grooves 22 and ribs 24. Thus when the block is in position the tread is extended to the desired and accessible elevation. There is a bore 26 formed through the bottom portion and one end of the bore at 28 is flush with the end 18. The other end is spaced from or terminates short of the forward end and is denoted at 30. Thus when the attachment block is applied on the pedal a major portion of the accelerator pedal is embraced and attached to the block. The forward portion of the underside of the block rest directly atop the tread of the accelerator pedal providing what may be called an overhanging surface 32 and this, not being tightly bound in place, may conform to the ribs on the tread surface of the accelerator pedal to bring about a more satisfactory cooperation of parts.

Since the invention is quite simple the manner in which it is constructed and applied is no doubt clear and evident to the reader. In these circumstances a more extensive specification is thought to be unnecessary.

Minor changes in shape, size, materials and rearrangement of parts coming within the spirit of the invention or scope of the same may be resorted to in actual practice and in keeping with the invention as claimed.

What is claimed as new is as follows:

As a new article of manufacture, an attachment for an accelerator pedal comprising an elongated substantially solid block of rubber generally wedge-shaped in side elevation, said block having a top surface provided with longitudinally disposed anti-skid ribs, the bottom portion of said block having a lengthwise passage of a width and otherwise proportioned to permit said block to be readily mounted on and removably attached to an accelerator pedal, said passage being flush at a rear end thereof with the rear end of the block and the forward end thereof being spaced rearwardly of the forward end of the block so that the forward portion of the bottom of the block proper projects beyond the forward end of the passage, the underneath side of said forwardly projecting end being adapted to contact and rest firmly atop a portion of the tread of said pedal adapted to be contacted thereby.

References Cited in the file of this patent

UNITED STATES PATENTS

| | | |
|---|---|---|
| 1,370,730 | Carver | Mar. 8, 1921 |
| 1,480,211 | Kauffman | Jan. 8, 1924 |
| 1,595,710 | Cocks | Aug. 10, 1926 |
| 1,706,003 | Swain | Mar. 19, 1929 |
| 1,736,309 | Dolling | Nov. 19, 1929 |
| 2,566,638 | Shoults et al. | Sept. 4, 1951 |
| 2,688,262 | Bolton | Sept. 7, 1954 |
| 2,840,845 | Wood | July 1, 1958 |